United States Patent [19]

Mikami et al.

[11] Patent Number: 4,680,528
[45] Date of Patent: Jul. 14, 1987

[54] BATTERY CHARGING DEVICE

[75] Inventors: Toshio Mikami; Yasuo Nagasawa, both of Saitama, Japan

[73] Assignee: Toko, Inc., Tokyo, Japan

[21] Appl. No.: 835,935

[22] Filed: Mar. 4, 1986

[30] Foreign Application Priority Data

Mar. 5, 1985 [JP] Japan .............................. 60-31268[U]

[51] Int. Cl.⁴ .............................................. H02J 7/00
[52] U.S. Cl. ....................................... 320/32; 320/15; 320/22; 320/39
[58] Field of Search ....................... 320/15, 22, 30, 31, 320/32, 39, 40, 2

[56] References Cited

U.S. PATENT DOCUMENTS 4,198,593  4/1980  Ballman ................................. 320/31
4,233,553  11/1980 Prince, Jr. et al. ................ 320/32 X
4,571,533  2/1986  Dey ..................................... 320/39 X
4,577,145  3/1986  Mullersman ........................... 320/2

Primary Examiner—Patrick R. Salce
Assistant Examiner—Anita M. Ault

[57] ABSTRACT

A battery charging device which is so designed that whether or not the battery is connected in position can be detected by utilizing a current detecting circuit instead of a mechanically-structured component, such as a switch.

2 Claims, 4 Drawing Figures

BATTERY CHARGING DEVICE

FIELD OF THE INVENTION

This invention relates to a device for charging a battery for use with portable electronic apparatus, and more particularly it pertains to such a device provided with improved means for detecting whether or not the battery is connected in position.

BACKGROUND OF THE INVENTION

In order to have a better understanding of the present invention, description will first be made of a conventional battery charging device, with reference to FIG. 1, which includes a DC power source 1, constant-current control circuit 2, constant-voltage control circuit 3, current detecting circuit 4, and switch 6 for detecting whether or not a battery 5 is connected in position. With this conventional device, by turning on a charging-starter switch 7, DC power is obtained at output terminals 8A and 8B so that the battery 5 connected therewith can be charged.

FIG. 3 illustrates the relationship between the output voltage V and output current I which occur at the output terminals 8A and 8B. As will be noted, the relationship represents a so-called drooping characteristic. Thus, if the battery is connected after the charging-starter switch 7 has been turned on, then a constant-voltage condition in which there prevails a charging voltage $V_1$ which is higher than a voltage $V_3$ prevailing at the end of the charging operation, will be changed to a constant-current condition where a charging current $I_l$ flows. In FIG. 3, $V_2$ represents a stand-by voltage which prevails after the battery 5 has been charged up or when the battery 5 is not connected. The stand-by voltage $V_2$, which is used primarily for preventing occurrence of an overcurrent, is selected to be lower than the voltage $V_3$.

Whether or not the battery 5 is connected in position, is detected by means of the switch 6 which is provided in the neighborhood of the output terminals 8A and 8B and arranged to be pressed by the battery 5 when the latter is connected in position. Completion of the charging of the battery 5 can be detected by using a timer (not shown) and/or means for detecting the peak voltage of the battery.

However, the above-described conventional device is disadvantageous in that the position where the switch 6, which is a mechanically-structured component, can be provided is limited to a position where it can be disposed into contact with the battery 5, thus deteriorating the space efficiency in the arrangement of the entire components. Obviously, this is undesirable from the standpoint of miniaturization of the battery charging device.

SUMMARY OF THE INVENTION

Accordingly, it is an object of the present invention to provide a battery charging device which is so designed that whether or not the battery is connected in position, is detected by means of a current detecting circuit, thereby eliminating the necessity to provide a mechanically-structured component such as the aforementioned switch 6.

According to an aspect of the present invention, there is provided a battery charging device which comprises a DC power source which is adapted to provide DC power at the output terminals when a charging-starter switch is turned on; a current detecting circuit adapted for detecting whether or not the battery is connected to the output terminals and for detecting a current which flows through the battery when the latter is connected to the output terminals; a constant-voltage control circuit responsive to a signal derived from the current detecting circuit to provide a charging voltage or standby voltage across the output terminals; and a constant-current control circuit responsive to the signal derived from the current detecting circuit to charge the battery with a constant current.

Other objects, features and advantages of the present invention will become apparent from the ensuing description taken in conjunction with the accompanying drawings.

DESCRIPTION OF THE PREFERRED EMBODIMENTS

Figure 1:
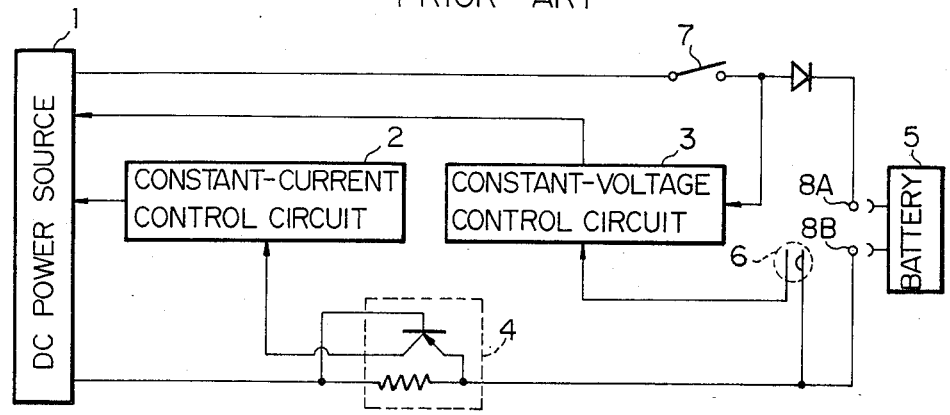
FIG. 1 is a block diagram showing a conventional battery charging device.
Figure 2:
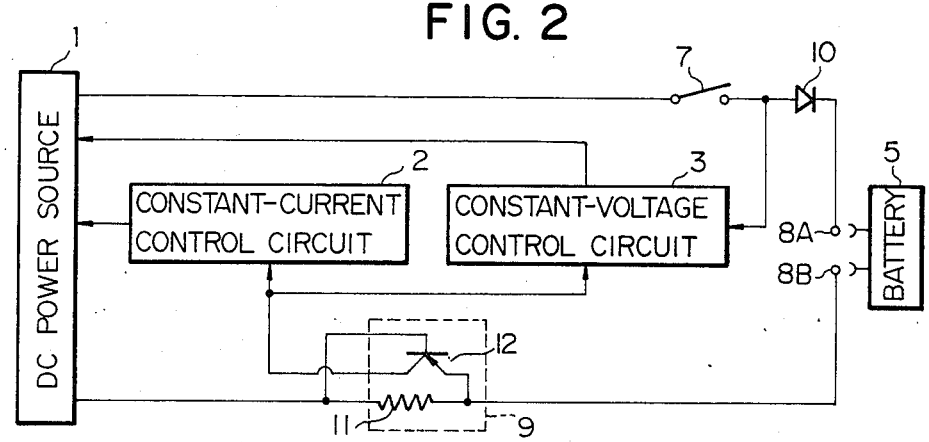
FIG. 2 is a block diagram showing the battery charging device according to an embodiment of the present invention.

Referring to FIG. 2, there is shown the battery charging device according to an embodiment of the present invention, wherein parts corresponding to FIG. 1 are indicated by like reference numerals.

A DC power source 1 has its "hot" side connected to an output terminal 8A through a charging-starter switch 7 and a reverse current preventing diode 10, and it has its "cold" side connected to another output terminal 8B through a current detecting circuit 9.

The current detecting circuit 9 comprises a resistor 11 for detecting a current, and a transistor 12 whose collector current is caused to flow by a voltage which occurs across the resistor 11. The circuit 9 is OR-connected to both the constant-current control circuit 2 and the constant-voltage control circuit 3.

The constant-voltage control circuit 3 which is connected to one terminal of the diode 10, is adapted to detect a voltage corresponding to the voltage across the output terminals 8A and 8B and feed the thus detected voltage back to the DC power source 1 so that an output is provided under a constant-voltage condition at the output terminals 8A and 8B. The constant-current control circuit 2 is adapted to feed back to the DC power source 1 the signal derived from the current detecting circuit 9 which is arranged to detect the current flowing through the output terminals 8A and 8B so that an output is provided under a constant-current condition at the output terminals 8A and 8B.

Figure 3:
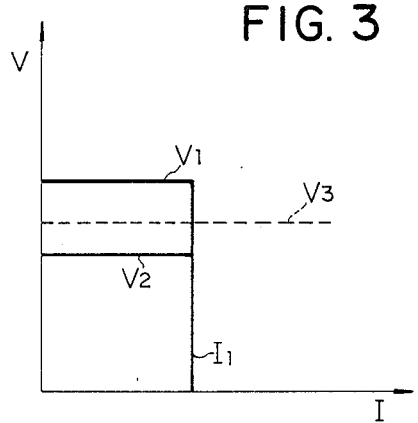
FIG. 3 illustrates the characteristic of the battery charging device.

The ranges for the constant-voltage and constant-current conditions are preset as illustrated in FIG. 3, from which it will be seen that the constant-voltage condition occurs for a low current while the constant-current condition occurs for a high current.

Furthermore, the current detecting circuit 9 is so designed as to detect both the condition where a current is flowing through the resistor 11 and the condition where no current is flowing therethrough. When no current is flowing through the resistor 11, the constant-current control circuit 3 provides a stand-by voltage $V_2$ at the output terminals 8A and 8B, while when a current is flowing through the resistor 11, the constant-voltage condition where the charging voltage $V_1$ prevails, is changed to the constant-current condition where the charging current $I_1$ flows, primarily under the action of the constant-current control circuit 2.

With the above-described battery charger of the present invention, when no battery 5 is connected to the output terminals 8A and 8B, no current is caused to flow through the resistor 11 by turning on the charge-starter switch 7; thus, no collector current is caused to flow through the transistor 12. The resultant signal is provided to both of the constant-current control circuit 2 and constant-voltage control circuit 3, so that the stand-by voltage $V_2$ is provided at the output terminals 8A and 8B under the action of the constant-voltage control circuit 3.

When the battery 5 is connected to the output terminals 8A and 8B and thus a current is caused to flow through the resistor 11, the transistor 12 is rendered conductive by a voltage across the resistor 11 so that a collector current is caused to flow therethrough. The resultant signal is provided to both of the constant-current control circuit 2 and constant-voltage control circuit 3, so that the charging voltage $V_1$ is provided at the output terminals 8A and 8B; thereupon, a constant-current condition occurs, and rapid charging of the battery 5 is effected with the charging current $I_1$ in the neighborhood of the charging voltage $V_1$.

It is possible that the current detecting circuit 9 may be constituted by using a current transformer.

Figure 4:
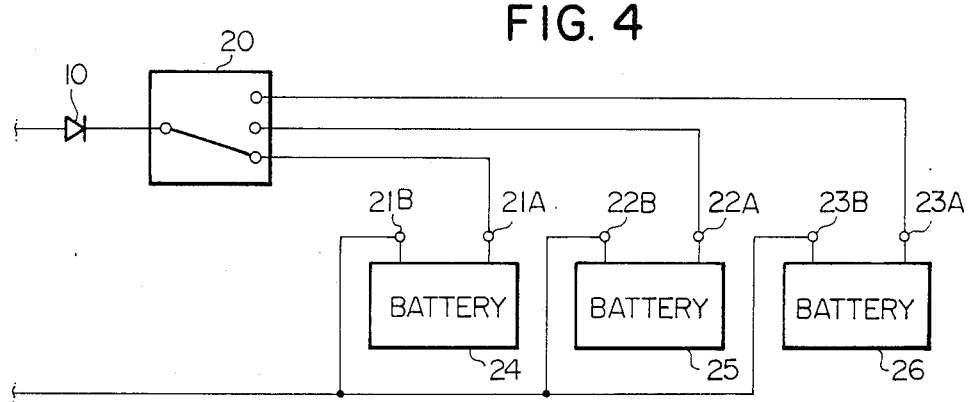
FIG. 4 is a fragmentary block diagram showing the battery charging device according to another embodiment of the present invention.

Referring to FIG. 4, there is shown, in a block diagram, the battery charging device according to another embodiment of the present invention, wherein only the output stage thereof is illustrated for the sake of simplicity. The battery charger of FIG. 4 includes three pairs of output terminals 21A and 21B; 22A and 22B; and 23A and 23B to which batteries 24, 25 and 26 are connected, respectively. The outut terminal pairs are switched by means of a switching circuit 20 so that the batteries 24, 25 and 26 can be successively charged. The switching circuit 20 comprises an electronic circuit including no mechanically-constructed components such as switches and which is so designed as to automatically change over the output terminals upon completion of charging of one battery.

It goes without saying that the the present charger may be so constructed that the three batteries can be charged at the same time by connecting the three pairs of output terminals in parallel to the "hot" and "cold" sides of the DC power source 1.

As will be appreciated from the above discussion, with the battery charging device of the present invention, detection as to whether or not a battery or batteries are connected in position, can be achieved with electronic circuits alone, instead of by using any mechanically-structured components such as switches, by virtue of the fact that a signal derived from the current detecting circuit is provided to both the constant-current control circuit and the constant-voltage control circuit.

Thus, according to the present invention, the necessity to provide a mechanically-structured part such as switch 6 which is limited in terms of mounting position as mentioned above, is eliminated so that miniaturization of the device can conveniently be achieved and the freedom of design thereof can also be enhanced. Needless to say, the manufacturing cost can be reduced correspondingly. Particularly, in the case where a plurality of pairs of output terminals are provided for charging a plurality of batteries either successively or concurrently, the manufacturing cost can greatly be reduced by virtue of the fact that there is no necessity to provide switches 6 to detect whether or not the respective batteries are connected in position. With the conventional construction mentioned hereinbefore, it has often happened that the charging voltage $V_l$ is produced at the output terminals when the switch 6 is pressed by an object other than the battery; according to the present invention, such erroneous operation can be perfectly avoided. Obviously, this is also desirable from the standpoint of protecting the charger.

While the present invention has been illustrated and described with respect to specific embodiments thereof, it is to be understood that the invention is by no means limited thereto but encompasses all changes and modifications which will become possible within the scope of the appended claims.

We claim:
1. A battery charging device, comprising:
   a DC power source, output terminals for a battery, and a charging-starter switch connected between said DC power source and said output terminals so as to provide DC power at the output terminals by turning on the charging-starter switch;
   a current detecting circuit connected to the output terminals for detecting whether or not a battery is connnected to the output terminals and for detecting a current flowing to the battery;
   a voltage control circuit responsive to a signal derived from said current detecting circuit to provide a charging voltage or stand-by voltage of a predetermined magnitude at the output terminals; and
   a current control circuit responsive to said signal to charge the battery with a current of a predetermined magnitude;
   said current detecting circuit being OR-connected to said voltage control circuit and to said current control circuit.
2. A battery charging device according to claim 1, wherein a plurality of pairs of said output terminals are provided.

* * * * *